April 2, 1940. C. F. JENKINS Re. 21,417
CELL PERSISTENCE TRANSMITTER
Original Filed July 16, 1928
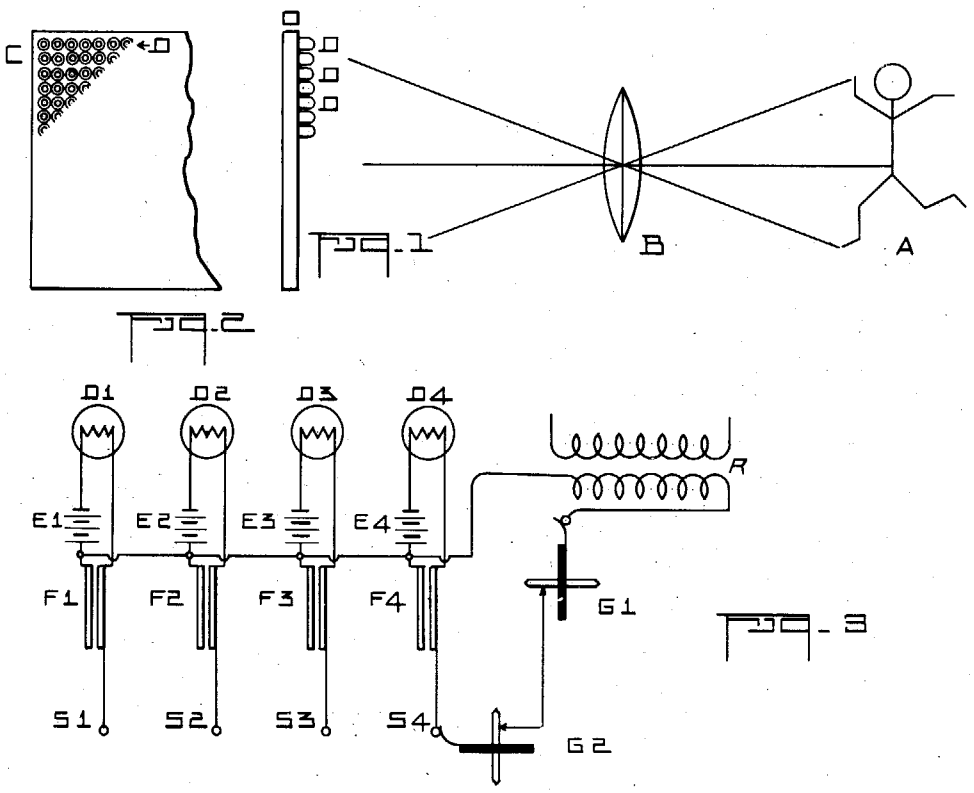
C. Francis Jenkins
INVENTOR
BY Darby & Darby
ATTORNEYS Reissued Apr. 2, 1940 Re. 21,417

UNITED STATES PATENT OFFICE 21,417

CELL PERSISTENCE TRANSMITTER

Charles Francis Jenkins, Washington, D. C., assignor, by mesne assignments, to Radio Corporation of America, New York, N. Y., a corporation of Delaware Original No. 1,756,291, dated April 29, 1930, Serial No. 292,992, July 16, 1928. Application for reissue April 16, 1932, Serial No. 605,762

1 Claim. (Cl. 178—7.1)

This invention relates to radiovision (vision by radio) or television (vision by wire), and has for its principal object means whereby the current output of the photoelectric or light-sensitive cells employed is increased by several thousand times.

In all methods heretofore suggested the image of the scene to be transmitted is swept across a light-sensitive cell in successive lines; or, if a single object, may be swept by an illuminating spot of light. The light sensitive cell is excited by the light energy of each particular elementary area of the image plane only for a small fraction of a second. This is because of the limitation of the completion time for scanning of the whole image, namely, persistence of vision of the human eye. This time may be as long as one-tenth of a second, though to avoid the flicker phenomena, the maximum time is usually not more than one-fifteenth of a second.

But if the image area be assumed to be divided into 50 lines and each line into 50 divisions, each elementary area is but $1/2500$ part of the whole. That is, it is effected by its particular elementary light strength for but $1/2500$ of $1/15$ of a second, or $1/32500$ part of a second.

This is well known, and accounts for the many schemes which have been proposed to conserve or increase the light-current output of the cells; for example, by employing very large cells, or by increasing the strength of the light falling on the cell.

Such methods give but a very small increase in cell output over old methods, and, therefore, radiovision and television transmission have been limited to simple objects and single subjects; and, even then only with indifferent results, for the light current efficiency is still limited to $1/2500$ part of the ideal scheme, i. e., continuous elementary area activity.

The present invention employs just that very phenomena, namely, continuous elementary area cell activity, and, therefore, other conditions being equal, the cell-current output is two thousand, five hundred times greater.

In general, this new method differs from the old in that whereas the old method activated the cell and immediately fed the resultant current into the transmitted circuit, or a time-current equal to $1/2500$ of the image time ($1/15$ of a second), the present method activates the cell all the time, accumulates the resultant current, and discharges it into the transmitted circuit in the elementary time.

There are other advantages possible, however. For example, instead of employing a light sensitive cell which has a reaction time of a millionth of a second, one may employ a cell having a reaction time of but $1/15$ of a second. And as such cells usually have a light-current output efficiency many hundred times greater than the potassium cells heretofore employed, the possibilities in radiovision are little more limited than they are in film movies camera work.

With these and other objects in view, the invention consists in the novel method and combination of means herein described and illustrated, and more particularly pointed out in the claim.

In the schematic drawing herewith, Figure 1 is a side elevation of the device; Figure 2 a partial view of the light-sensitive image plane showing how the elementary areas are provided with individual cells; Figure 3 details of cell-loading and discharge circuits.

In Figure 1, A is the subject to be transmitted; B a lens for imaging the scene onto the cell-area plane C, which consists of a plurality of small light-sensitive cells D, D, D, from each of which a wire extends to a segment S, of the commutator of the switching gear; the support C for the cells D acting as a common return of the discharge circuit.

In Figure 3 the cells D are in a circuit with a battery E, and a condenser F.

The normal result of the action of the battery when light falls on the cell is to charge the condenser, which, of course, acts to accumulate a charge equal to its capacity. The amount of this cumulative charge on the condenser is a factor of the light intensity on the cell by the time of application. But as the time is a fixed factor in this use of the device, then the loading of the condenser may be considered as a factor of the light strength only.

The time referred to is $1/15$ of a second, the time between discharges of the condenser, namely, from the moment the commutator brush of the switching gear $G^1$ touches a segment S, and its return to the elementary area represented thereby.

Assuming the cell $D^4$ (Figure 3) to have been exposed to light, then circuit completed through $C^4$, $E^4$, $F^4$, $S^4$, and the switching gear $G^1$ and $G^2$, and coupling coil R, back to $D^4$, obviously discharges the condenser $F^4$.

After such discharge the commutator brush passes on to the next segment to discharge the next cell-battery-condenser circuit, while the previous condenser begins to accumulate a new charge proportionate to the light strength falling thereon at the moment.

It will appear obvious that as the total charge in the condenser is proportionate to the intensity of the light falling on the cell, the current discharged from the condenser-accumulator may, at some distant place, be translated back into a corresponding strength of light. If this current light translation occurs at the right time to illuminate an elementary area corresponding to the light-cell area of the analyzed image at the transmitter, then an exact facsimile of the scene at the transmitting station will be reproduced at the receiving station.

Obviously, I do not wish to limit myself to any particularly light-sensitive cell; nor to any definite number of elementary areas per image. In actual practice 2304 instead of 2500 elementary areas are preferred.

What I claim is—

In a television system, a panel area divided into a plurality of elemental areas of a number corresponding to the number of image points of resolution in an optical image area to be scanned, a light sensitive element positioned at each of the plurality of image areas, said light-sensitive elements each having the property that the resistance thereof varies substantially in proportion to the light intensity of the optical image falling thereupon, a potential source and a condenser serially connected with each light sensitive element whereby the potential source charges each condenser through the light sensitive element so that the charging current is substantially proportional to the light intensity instantaneously influencing the light sensitive element, a pair of serially connected distributor elements and means for connecting the distributor elements to the said condensers in sequence to discharge the energy stored in said condensers and a load circuit to receive the stored energy discharged by the distributors.

CHARLES FRANCIS JENKINS.